United States Patent [19]
Ohashi et al.

[11] Patent Number: 5,798,813
[45] Date of Patent: Aug. 25, 1998

[54] LIQUID CRYSTAL CELL AND METHOD FOR PRODUCING THE SAME IN WHICH A LIQUID CRYSTAL INLET PORT OPENING WIDTH IS LARGER THAN AN EFFECTIVE DISPLAY AREA WIDTH

[75] Inventors: Nobuhiko Ohashi, Kariya; Takeshi Kohama, Okazaki; Tetsuya Sano, Obu, all of Japan

[73] Assignee: Ipics Corporation, Japan

[21] Appl. No.: 716,993

[22] Filed: Sep. 20, 1996

[30] Foreign Application Priority Data

Sep. 21, 1995 [JP] Japan ................................. 7-243401
Jul. 2, 1996 [JP] Japan ................................. 8-172554

[51] Int. Cl.$^6$ ............................................. G02F 1/1339
[52] U.S. Cl. ............................................. 349/154; 349/190
[58] Field of Search ............................. 349/153, 154, 349/189, 190

[56] References Cited

U.S. PATENT DOCUMENTS

| | | | |
|---|---|---|---|
| 4,094,058 | 6/1978 | Yasutake et al. | 349/153 |
| 5,193,019 | 3/1993 | Watanabe | 349/189 |
| 5,355,236 | 10/1994 | Mitsui . | |
| 5,381,255 | 1/1995 | Ohnuma et al. . | |

FOREIGN PATENT DOCUMENTS

| | | |
|---|---|---|
| 312028 | 4/1989 | European Pat. Off. . |
| 635749 | 1/1995 | European Pat. Off. . |
| 60-107021 | 6/1985 | Japan . |
| 61-045225 | 3/1986 | Japan . |
| 62-150322 | 7/1987 | Japan . |
| 63-225223 | 9/1988 | Japan . |
| 4-163424 | 6/1992 | Japan ............................. 349/153 |
| 4316021 | 11/1992 | Japan . |
| 5-53126 | 3/1993 | Japan . |
| 5-127180 | 5/1993 | Japan . |

*Primary Examiner*—William L. Sikes
*Assistant Examiner*—Walter Malinowski
*Attorney, Agent, or Firm*—Cushman Darby & Cushman Intellectual Property Group of Pillsbury Madieon & Sutro, LLP

[57] ABSTRACT

A liquid crystal cell includes a color filter substrate and an opposite substrate which are overlapped on each other with a seal interposed therebetween. The seal has a liquid crystal inlet port through which liquid crystal is filled into a space enclosed by the seal between the substrates. A width of the liquid crystal inlet port is made wider than a width of an effective display area of the liquid crystal cell, so that, when the liquid crystal is filled into the liquid crystal cell, the liquid crystal flows uniformly without disturbing an orientation of the liquid crystal.

10 Claims, 12 Drawing Sheets

EFFECTIVE DISPLAY AREA

EFFECTIVE DISPLAY AREA

LIQUID CRYSTAL CELL AND METHOD FOR PRODUCING THE SAME IN WHICH A LIQUID CRYSTAL INLET PORT OPENING WIDTH IS LARGER THAN AN EFFECTIVE DISPLAY AREA WIDTH

CROSS REFERENCE TO RELATED APPLICATIONS

This application is based upon and claims the benefit of priority of the prior Japanese Patent Applications No. Hei. 7-243401 filed on Sep. 21, 1995, and NO. Hei. 8-172554 filed on Jul. 2, 1996, the contents of which are incorporated herein by reference.

BACKGROUND OF THE INVENTION

1. Field of the Invention

The present invention generally relates to liquid crystal cells into which various types of liquid crystal, such as smectic liquid crystal or the like, are filled. The present invention also relates to methods for producing the same.

2. Related Arts

Figure 21:
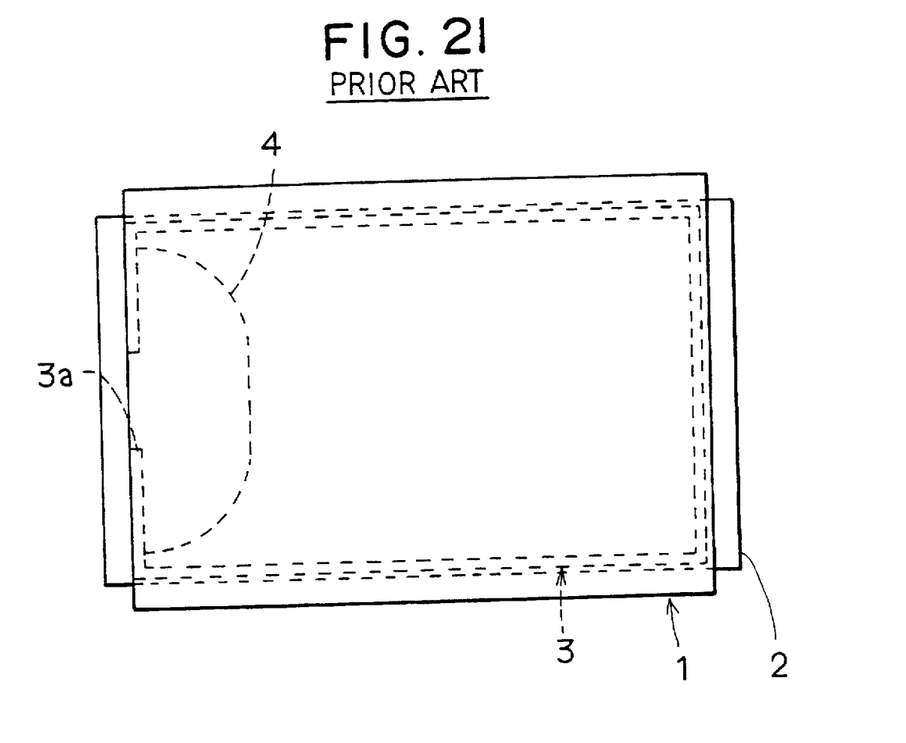
FIG. 21 is a plane view showing a liquid crystal cell and a state where liquid crystal is being filled into the liquid crystal cell according to a prior art.

In a conventional method for producing a liquid crystal cell, as shown in FIG. 21 (refer to JP-A-4-316021), smectic liquid crystal 4 is filled into a space between electrode substrates 1 and 2 which are overlapped on each other with a band-like seal 3 interposed threrebetween. To fill the liquid crystal 4 into the liquid crystal cell, the smectic liquid crystal 4 is dropped around a liquid crystal inlet port 3a of the seal 3 and heated to be softened, thereby closing the liquid crystal inlet port 3a, while the electrode substrates 1 and 2 are disposed under vacuum in a vacuum chamber. Thereafter, the vacuum chamber is opened to an atmospheric pressure, so that a pressure difference between the outside and the inside of the space between the electrode substrates 1 and 2 is produced. Accordingly, the smectic liquid crystal 4 is absorbed into and fills the space between the electrode substrates 1 and 2.

However, in the conventional method for filling the liquid crystal, as mentioned above, the liquid crystal inlet port 3a is formed on a central portion of a side of the seal 3. Therefore, as shown in FIG. 21, the smectic liquid crystal 4 entered the space between the electrode substrates 1 and 2 through the liquid crystal inlet port 3a can not flow uniformly, and, accordingly, spreads out in a crosswise direction of the inlet port 3a.

On the other hand, an alignment film is formed on the electrode substrates by a rubbing treatment so that an axis of each liquid crystal molecule of the smectic liquid crystal 4 is oriented in a rubbing direction.

When the smectic liquid crystal spreads out in the crosswise direction of the inlet port 3a, the liquid crystal flows in different directions from the rubbing direction of the alignment film. Accordingly, the smectic liquid crystal positioned close to the inlet port 3a is oriented differently from the smectic liquid crystal at other positions oriented in the rubbing direction. In other words, the liquid crystal filled in the space can not be oriented uniformly. As a result, there occurs a problem that the liquid crystal cell having such an irregularly oriented liquid crystal produces an uneven display.

SUMMARY OF THE INVENTION

The present invention has been made in view of the above mentioned problem and it is an object of the present invention to provide a liquid crystal cell capable of producing an even display. More particularly, it is an object of the present invention to provide structures and methods for filling liquid crystal into a space between both electrode substrates, thereby providing a liquid crystal cell in which the liquid crystal is filled with an uniform orientation.

According to one aspect of the present invention, in a liquid crystal cell including a first and a second electrode substrate overlapped on each other, liquid crystal filled into a space between the first and second substrates, and a seal with a liquid crystal inlet port, a width of the liquid crystal inlet port is made larger than a width of an effective display area of the liquid crystal cell, so that the liquid crystal can be smoothly filled into the space between the two substrates with a uniform orientation.

Further, the liquid crystal cell includes a plurality of small dam seals formed dispersively in the liquid crystal inlet port with a predetermined shape, such as a column shape, a streamline shape, or the like, so that no filling marks remain in the liquid crystal cell when the liquid crystal is filled into the liquid crystal cell.

Further, a gap between both of the electrode substrates in an area between the liquid crystal inlet port and the effective display area is larger than that in the effective display area.

Furthermore, the liquid crystal cell includes stripes of resist pillars formed between both of the electrode substrates, the pillars stretching to a direction of the liquid crystal filling flow, so that the gap between the two electrode substrates can be kept accurately and the liquid crystal flows smoothly when it is filled into the gap.

According to another aspect of the present invention, there is provided an improved method of producing the above mentioned liquid crystal cell. The method includes a step of forming the seal on one of the electrode substrates with the liquid crystal inlet port, the opening width of which is larger than that of the effective display area, a step of overlapping the electrode substrate on the other electrode substrate, and a step of filling the liquid crystal into the gap between the two substrates through the liquid crystal inlet port so that a flow of the liquid crystal is substantially uniform.

Further, the method includes a step of forming dam seals dispersively in the liquid crystal inlet port before the step of overlapping the electrode substrates, so that the dam seals do not disturb the flow of the liquid crystal.

Further, the method includes a step of forming an additional dummy seal before the electrode substrates are overlapped.

Furthermore, the liquid crystal cell has its orientation control direction, so that the liquid crystal is filled generally parallel to the orientation control direction.

By employing the constructions and using the methods according to the present invention, the liquid crystal is filled uniformly into the liquid crystal cell gap through the liquid crystal inlet port without any stagnation, and the cell gap is kept appropriately at the same time. As a result, molecules of the liquid crystal are uniformly oriented without leaving any filling marks in the liquid crystal cell, and thus a uniform display with a high contrast can be attained.

BRIEF DESCRIPTION OF THE DRAWINGS

The present invention will become more fully understood from the detailed description given hereinbelow and the accompanying drawings which are given by way of illustration only and are not intended to limit the present invention, and wherein.

DETAILED DESCRIPTION OF THE PRESENTLY PREFERRED EXEMPLARY EMBODIMENTS

Embodiments according to the present invention will be described hereinunder with respect to the drawings.

A first embodiment of the present invention will be described on the basis of FIGS. 1 to 6.

Figure 1:
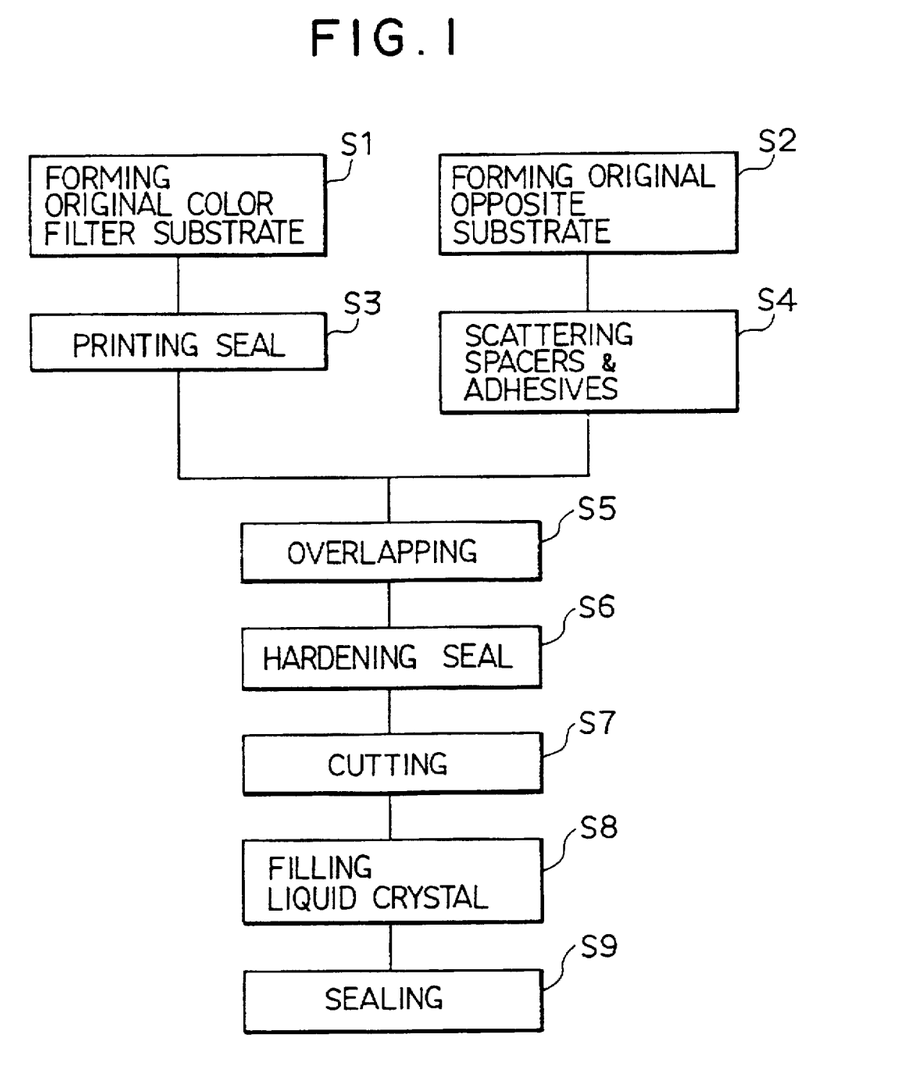
FIG. 1 is a flow chart showing manufacturing processes of a liquid crystal cell according to a first embodiment of the present invention.
Figure 3:
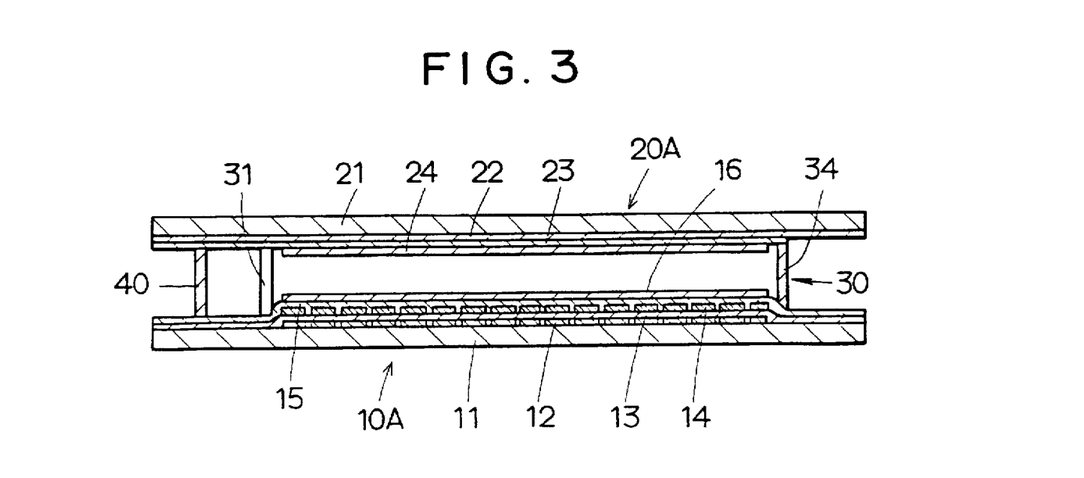
FIG. 3 is a cross-sectional view along the section III—III in FIG. 2 showing the liquid crystal cell of the first embodiment.

FIG. 1 shows manufacturing processes of a liquid crystal cell of the first embodiment according to the present invention. First, in an original color filter substrate formation process S1, an original substrate 10A for constituting a color filter substrate 10 (see FIG. 4) is formed as shown in FIG. 3. The original substrate 10A is formed by laminating thin film layers on a transparent glass substrate 11. The layers on the glass substrate 11 are, counting from the surface of the glass substrate 11, color filters 12 consisting of a plurality of stripes, a protection film 13, transparent electrodes 14 consisting of a plurality of stripes, an insulating film 15, and an alignment film 16.

Figure 5:
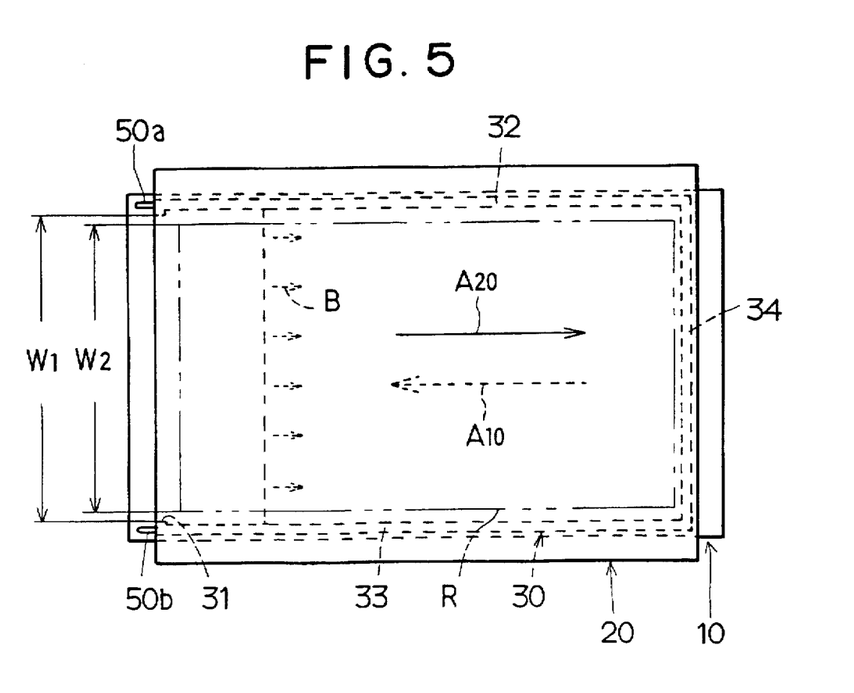
FIG. 5 is a plane view showing a flow-direction of liquid crystal to be filled into a cell gap of the first embodiment.

On the alignment film 16 of the original substrate 10A, a rubbing treatment (orientation control treatment) is performed in a direction indicated by an arrow A10 in FIG. 5.

In an original opposite substrate formation process S2, an original substrate 20A for constituting an opposite substrate 20 (see FIG. 4) is formed as shown in FIG. 3. The original substrate 20A is formed by laminating thin film layers, transparent electrodes 22 consisting of a plurality of stripes, an insulating film 23, and an alignment film 24, on an transparent glass substrate 21 in this order.

On the alignment film 24 of the original substrate 20A, the rubbing treatment is performed in a direction opposite to the rubbing direction of the alignment film 16 (a direction indicated by an arrow A20 in FIG. 5).

Figure 2:
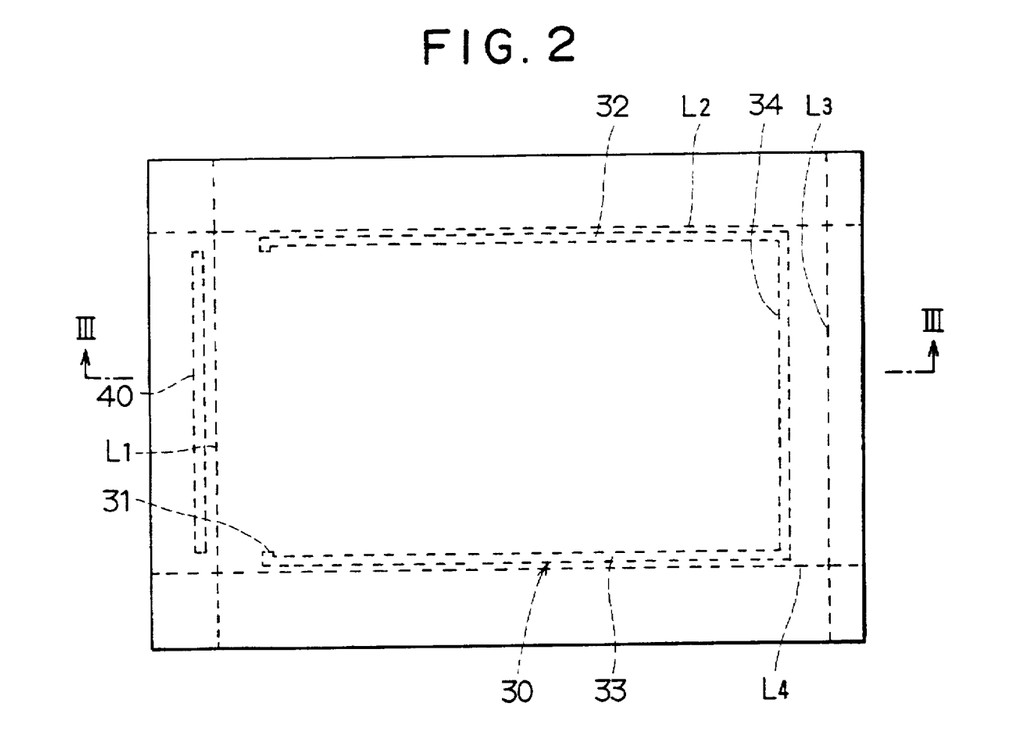
FIG. 2 is a plane view showing the liquid crystal cell with original substrates according to the first embodiment.

Next, in a seal printing process S3, a generally U-shaped stripe of a seal 30 is printed on the insulating film 15 around a vicinity of the outer periphery of the alignment film 16 as shown in FIGS. 2 and 3.

The seal 30 is composed of an upper side 32, a lower side 33 and a right side 34, and an opening as a liquid crystal inlet port 31 is provided at the left side thereof as shown in FIG. 2. An opening width W1 of the liquid crystal inlet port 31 is made larger than a width W2 of an effective display area R of the liquid crystal cell (an area enclosed by a two-point chain line in FIG. 5) as shown in FIG. 5. The effective display area R corresponds to an area where the alignment films 16 and 24 exist.

A dummy seal 40 is also printed on the insulating film 15 parallel to a scribe-line L1 which will be explained later. A length of the dummy seal 40 is generally equal to the opening width W1 of the liquid crystal inlet port 31. The shape of the dummy seal 40 is not limited to the straight line, but may be changed to any suitable shape.

Next, in a spacers and fine-grained adhesives scattering process S4, plural spacers and fine-grained adhesives (not shown) are scattered on the alignment film 24 of the original substrate 20A.

Thereafter, in an overlapping process S5, the original substrate 20A is overlapped on the original substrate 10A with the seal 30, the dummy seal 40, the spacers, and the fine-grained adhesives interposed therebetween.

In a seal hardening process S6, thus overlapped original substrates 10A and 20A are heated while a pressure or load is applied thereto, whereby the seal 30 and the dummy seal 40 are hardened. In this case, as the dummy seal 40 is formed as mentioned above, a gap between the substrates 10A and 20A can be kept appropriately despite of the load applied to the substrates.

Figure 4:
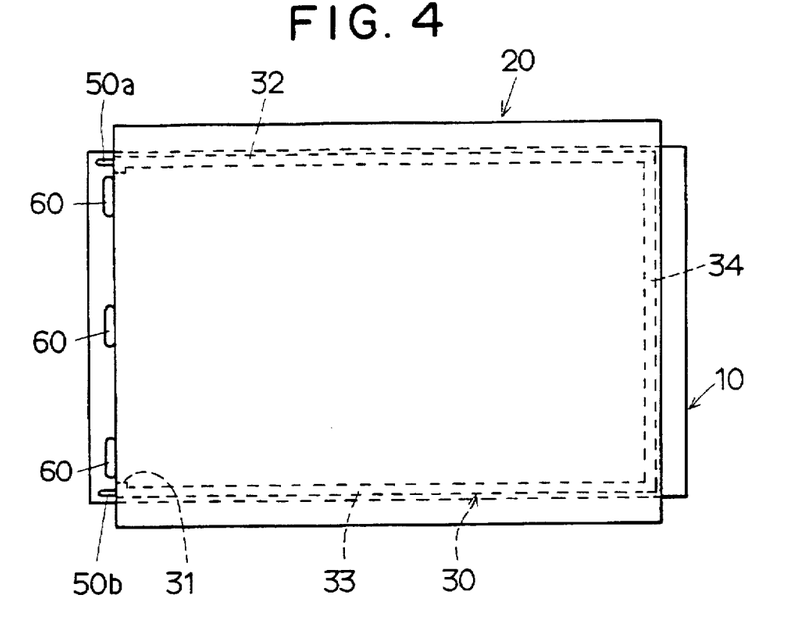
FIG. 4 is a plane view showing a state where liquid crystal is dispersively placed on the substrate of the first embodiment.

After the seal hardening process S6, cutting process S7 is performed. In this process, the scribe-lines L1 to L4 are scribed on the original substrate 10A as shown in FIG. 2 so that the original substrate 10A can be cut into a shape of the color filter substrate 10 as shown in FIG. 4. Further, the scribe-lines are scribed on the original substrate 20A so that the original substrate 20A can be cut into a shape of the opposite substrate 20 as shown in FIG. 4.

Next, the original substrates 10A and 20A are cut along the scribe-lines. Cut-out portions of the original substrates 10A and 20A are removed, whereby the liquid crystal cell composed of the color filter substrate 10 and the opposite substrate 20 without the liquid crystal therebetween is completed as shown in FIG. 4. The dummy seal 40 is removed together with the cut-out portions.

Next, in a liquid crystal filling process S8, as shown in FIGS. 4 and 5, members 50a and 50b for stopping a flow of the liquid crystal are formed on both ends of the liquid crystal inlet port 31. The stopping members 50a and 50b are made of a resin which is hardened by an ultra violet ray. Thereafter, droplets of antiferroelectric liquid crystal 60 are placed dispersively at the inlet port 31 on an inner surface of the color filter substrate 10 as shown in FIG. 4. The droplets of antiferroelectric liquid crystal 60 is prevented from flowing outward by the stopping members 50a and 50b.

Figure 6:
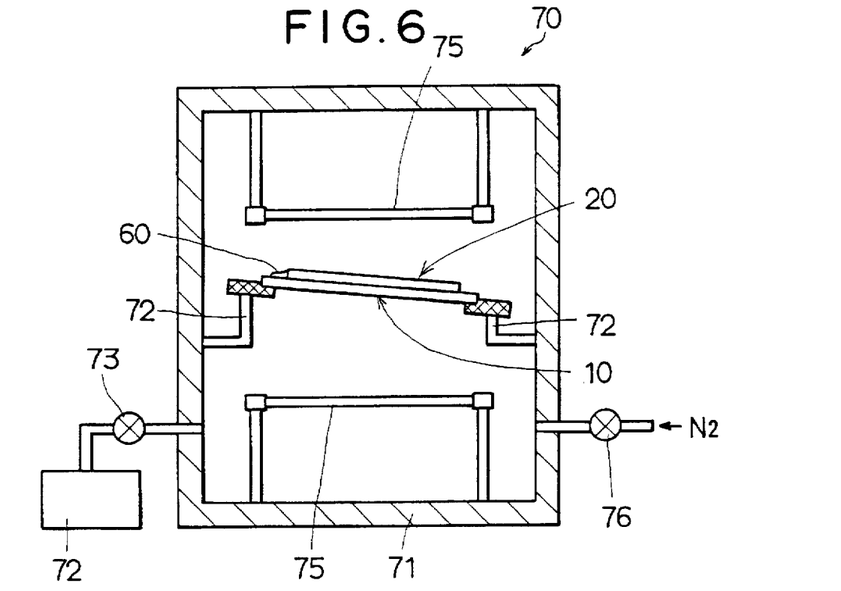
FIG. 6 is a schematic cross-sectional view showing the liquid crystal cell disposed in a liquid crystal filling device.

The liquid crystal cell carrying the droplets of antiferroelectric liquid crystal 60 is disposed in a chamber 71 of a liquid crystal filling device 70 (see FIG. 6). In the chamber 71, the liquid crystal cell is held by cell holders 72.

In this state, an exhaust valve 73 is opened, so that a pressure in the chamber 71 is reduced to $5 \times 10^{-4}$ Torr. Thereafter, the liquid crystal cell is heated by far infrared ray heaters 75° to 120° C. When a temperature of the antiferroelectric liquid crystal 60 exceeds its transition temperature in which the liquid crystal 60 transforms into an isotropic phase (e.g., 85° C.), the antiferroelectric liquid crystal 60 softens, thereby flowing to close the opening of the liquid crystal inlet port 31.

Thereafter, a leak valve 76 is opened and $N_2$ gas is introduced in the chamber 71, so that the pressure in the chamber 71 is returned to an atmospheric pressure. Accordingly, a pressure difference between the inside and the outside of the liquid crystal cell is created, whereby the softened antiferroelectric liquid crystal 60 flows into the liquid crystal cell through the liquid crystal inlet port 31.

In this case, as mentioned above, the opening width W1 of the liquid crystal inlet port 31 is larger than the width W2 of the effective display area R, and there is nothing to interrupt a flow of the antiferroelectric liquid crystal 60. Therefore, when the antiferroelectric liquid crystal 60 is filled into the liquid crystal cell, the liquid crystal 60 is kept to flow uniformly and generally in parallel to the sides 32 and 33 of the seal 30 from the liquid crystal inlet port 31 to the rear side 34 of the seal 30 as indicated by arrows B in FIG. 5.

Even when an filling speed of the liquid crystal 60 is not controlled, the speed of the flow of the liquid crystal 60 into the liquid crystal cell can be kept uniform. Therefore, the liquid crystal 60 is filled into the liquid crystal cell uniformly without any stagnation in the flow thereof. Consequently, a uniform orientation of molecules of the liquid crystal 60 can be attained without leaving any filling marks in the liquid crystal cell, whereby an uneven display of the liquid crystal cell can be prevented.

Further, as the flowing direction of the liquid crystal 60 corresponds to the rubbing direction of the alignment films 16 and 24, the uniform orientation of the liquid crystal 60 can be secured. Therefore, the liquid crystal cell can provide a high contrast display over the entire effective display area.

Finally, in a sealing process S9, the liquid crystal inlet port 31 is sealed, and the entire manufacturing processes of the liquid crystal cell are completed.

FIGS. 7 to 10 show a second embodiment of the present invention.

Figure 7:
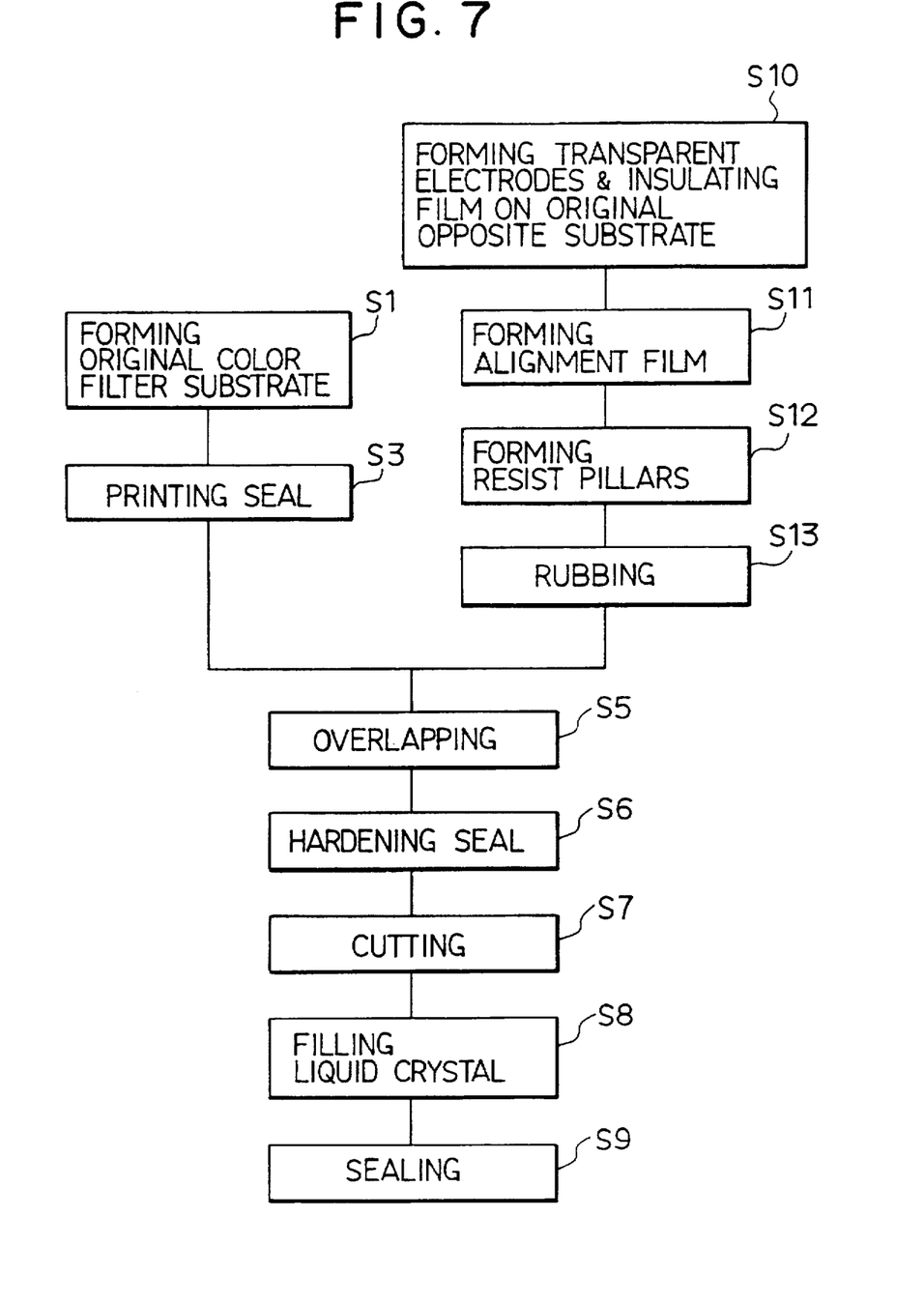
FIG. 7 is a flow chart showing manufacturing processes for a liquid crystal cell according to a second embodiment of the present invention.
Figure 8:
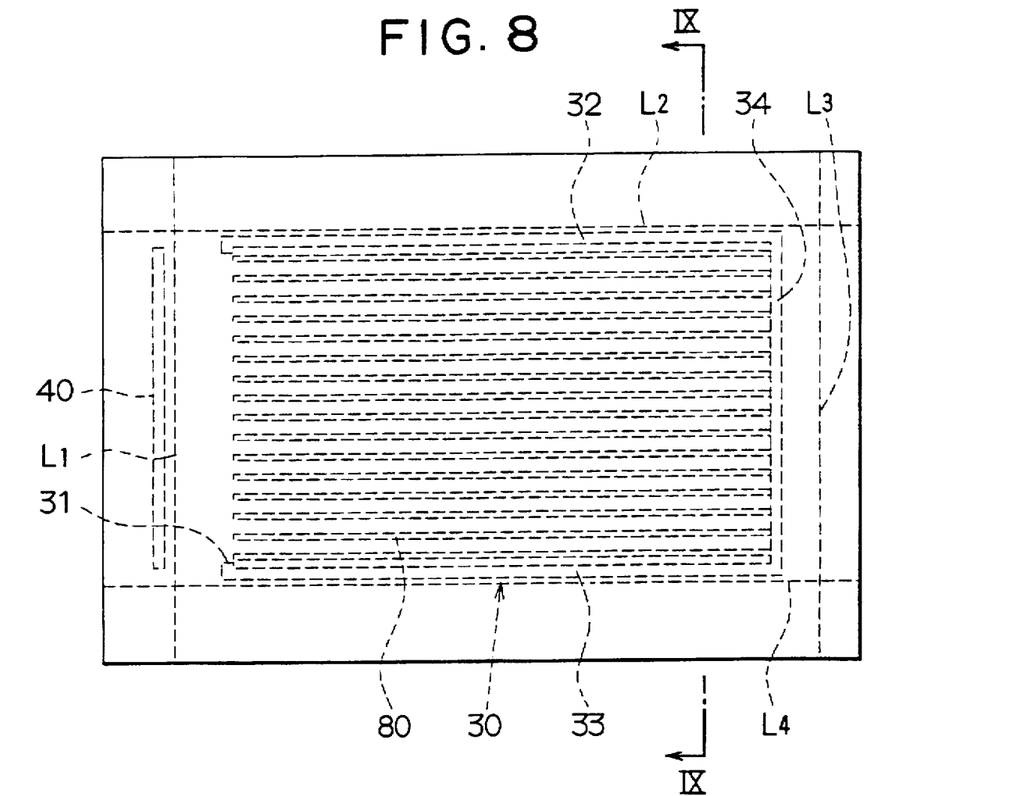
FIG. 8 is a plane view of the liquid crystal cell with original substrates according to the second embodiment.
Figure 9:
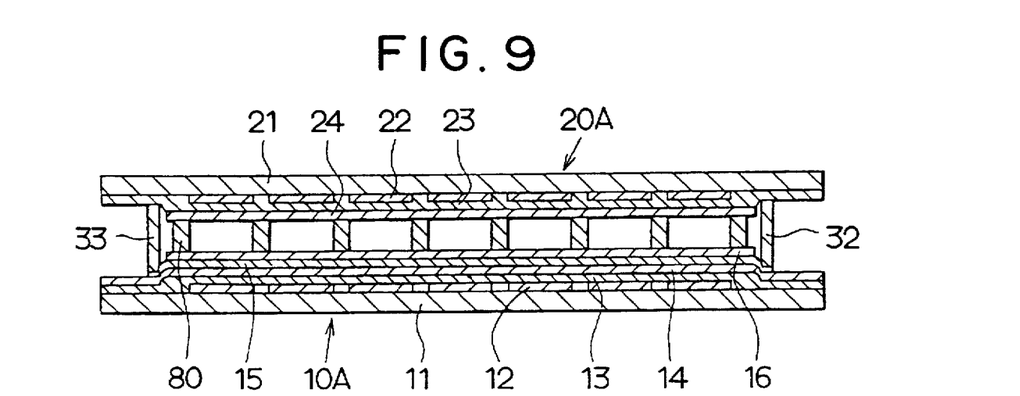
FIG. 9 is a cross-sectional view along the section IX—IX in FIG. 8, showing the liquid crystal cell, with a portion enlarged, of the second embodiment.
Figure 10:
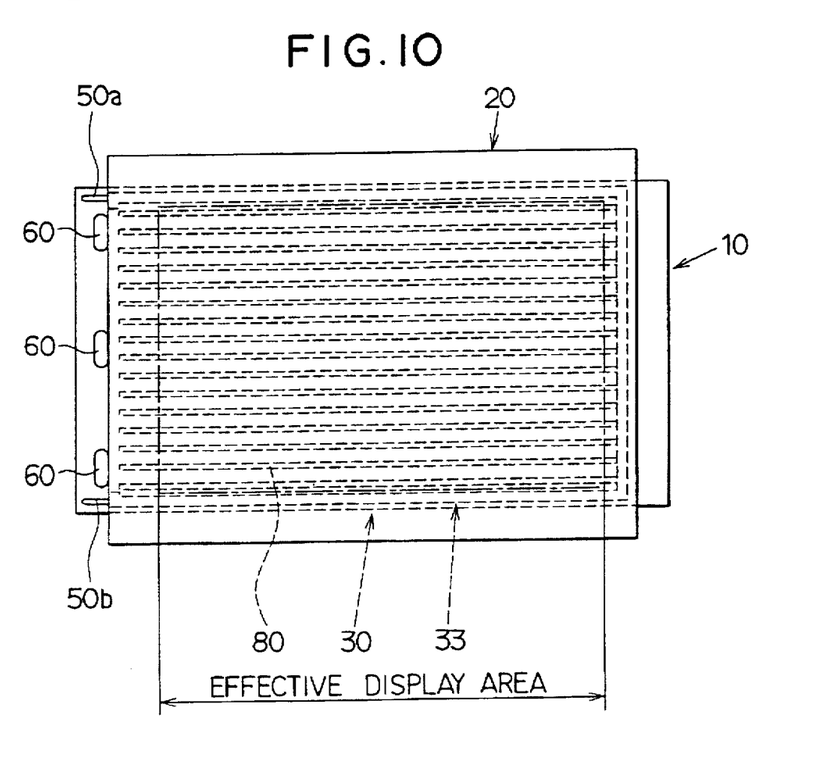
FIG. 10 is a plane view showing a state where liquid crystal is dispersively placed on the substrate of the second embodiment.

In the second embodiment, as shown in FIG. 7, a process for forming a transparent electrode film and an insulating film on an opposite substrate S10, an alignment film formation process S11, a resist film formation process S12, and a rubbing treatment process S13 are adopted in place of the original opposite substrate formation process S2 and the spacers and fine-grained adhesives scattering process S4 in the first embodiment.

In the process S10, transparent electrodes 22 consisting of a plurality of stripes and an insulating film 23 are deposited on a transparent glass substrate 21 in this order in the same manner as in the first embodiment.

Thereafter, in the alignment film formation process S11, an alignment film 24 is formed on the insulating film 23.

In the next process, the resist film formation process S12, a photoresist film is deposited with a predetermined thickness on the alignment film 24 (for example, 1.83 μm) by a spin coat method.

Next, an exposure treatment and a development treatment are performed on the photoresist film, whereby plural stripes of resist pillars 80 are formed. The pillars 80 stretch straight in parallel to sides 32 and 33 of a seal 30 (see FIGS. 8 and 9). A width of each one of the resist pillars 80 is 50 μm, and a pitch between the neighboring resist pillars 80 is 400 μm.

Next, in the rubbing treatment process S13, a rubbing treatment is performed on the alignment film 24 so that a rubbing direction is opposite to a rubbing direction of an alignment film 16 in the same manner as mentioned in the first embodiment. In this case, the rubbing direction of the alignment film 24 is parallel to a longitudinal direction of the resist pillars 80.

Through the processes S10 to S13, an original substrate 20A with the resist pillars 80 for use in the second embodiment is completed.

Thereafter, in an overlapping process S5, the original substrate 20A is overlapped on the original substrate 10A with the seal 30, a dummy seal 40 and the resist pillars 80 interposed therebetween.

In a seal hardening process S6, thus overlapped original substrates 10A and 20A are heated while a pressure or load is applied thereto, whereby the seal 30, the dummy seal 40, and resist pillars 80 are hardened.

A gap between the substrates 10A and 20A can be kept appropriately not only by the dummy seal 40, but also by the resist pillars 80 which adhere to opposite surfaces of the original substrates 10A and 20A securely.

Since a total area of the resist pillars 80 contacting and connecting two substrates 10A and 20A is larger than that of the fine grained adhesives in the first embodiment, a bonding strength between the original substrates 10A and 20A is greatly increased. Further, since each resist pillar 80 functions as a spacer, it is not necessary to use the spacers.

Next, in a liquid crystal injection process S8, droplets of antiferroelectric liquid crystal 60 are placed dispersively on a color filter substrate 10 (see FIG. 10) in the same way as mentioned in the first embodiment. Thereafter, the liquid crystal 60 is filled into the liquid crystal cell through the liquid crystal inlet port 31 in the same way as mentioned in the first embodiment. The liquid crystal 60 flows smoothly into the liquid crystal cell along the resist pillars 80 through the liquid crystal inlet port 31, the width of which is larger than that of the effective display area.

As a result, the liquid crystal is filled into the liquid crystal cell without any stagnation in a flow thereof and oriented uniformly. The other processes and effects are the same as those in the first embodiment.

Next, a third embodiment will be described referring to FIGS. 11 and 12.

In the third embodiment, when a seal 30 is printed in a seal printing process S3 as mentioned in the first embodiment, plural dam seals 31a are printed on the insulating film 15 in a liquid crystal inlet port 31. Each shape of dam seals 31a is an oblong ellipse with a longitudinal axis perpendicular to the liquid crystal filling flow, as shown in FIG. 11. Further, two lines of dam seals are printed with a staggered arrangement as shown in the drawing. In this embodiment, the liquid crystal inlet port 31 with the plural dam seals 31a printed therein with the staggered arrangement is called hereafter a liquid crystal inlet port 35. The shape of dam seals 31a is not limited to the oblong ellipse, but may be changed to other shapes such as a streamlined shape or the like.

Figure 11:
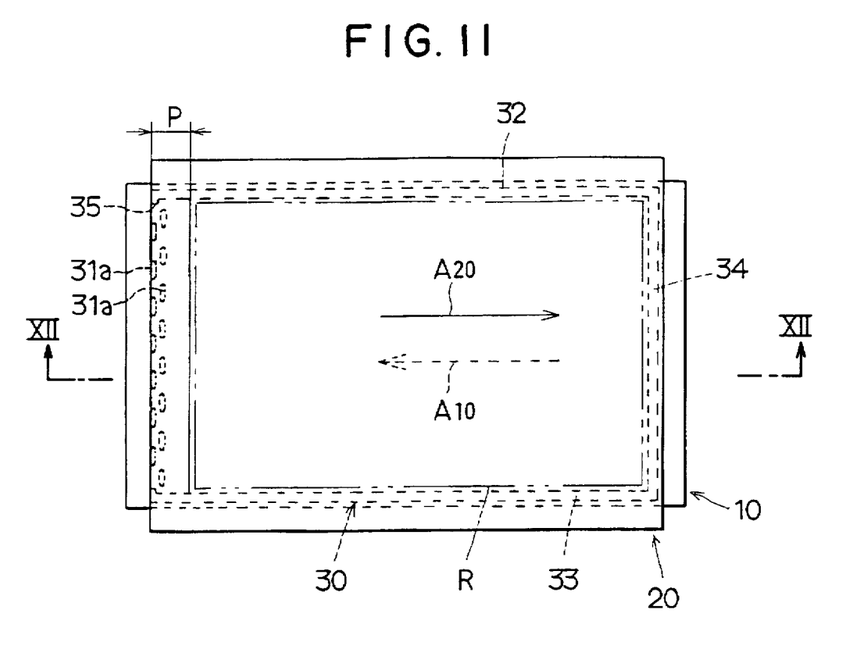
FIG. 11 is a plane view showing a liquid crystal cell of a third embodiment.
Figure 12:
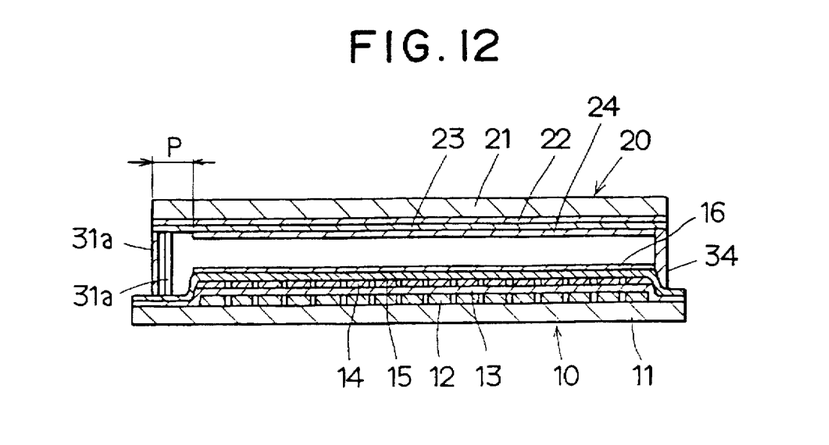
FIG. 12 is a cross-sectional view along the section XII—XII in FIG. 11 showing the liquid crystal cell of the third embodiment.

The liquid crystal inlet port 35 is formed apart from the effective display area R with a predetermined space P (for example, 10 mm) on the left side of the effective display area R as shown in FIGS. 11 and 12. In this case, a cell gap (for example, 3.3 μm) between an opposite substrate 20 and a color filter substrate 10 in the space P is larger than a cell gap (for example, 1.7 μm) in the effective display area R by at least a thickness of color filters 12 as shown in FIG. 12. Since the dam seals 31a function as the dummy seal 40 in the first embodiment, the dummy seal 40 is not used in this third embodiment.

Thereafter, in a liquid crystal filling process S8, liquid crystal is filled into an empty liquid crystal cell gap through the liquid crystal inlet port 35 in the same way as mentioned in the first embodiment.

The filling speed of the liquid crystal becomes fast proportionally to the size of the above mentioned cell gap. Since the size of the cell gap in the space P is larger than that in the effective display area R, the speed of the liquid crystal flowed passing through the cell gap in the effective display area R is slower than that in the space P. Consequently, turbulence in a flow of the liquid crystal created by the dam seals 31a is mitigated by a decrease of the flow speed of the liquid crystal in the area R, whereby the liquid crystal is filled into the cell gap smoothly and uniformly.

Since the flow of the liquid crystal becomes uniform due to the gap size difference between in the space P and the area R, no filling marks are left and the flow direction matches to the rubbing direction of the alignment films 16 and 24, as well. As a result, a uniform orientation of the liquid crystal can be attained, whereby the same high contrast display can be realized over the effective display area R as in the first embodiment. Further, the strength of the liquid crystal cell can be improved by the dam seals 31a.

Although in the third embodiment the cell gap in the space P is enlarged at least by the thickness of the color filters 12, the insulating film 15 and the protection film 13 may be removed by a photo-etching method or a partial polishing method so that the cell gap in the space P is further enlarged.

Next, a fourth embodiment will be described referring to FIGS. 13 and 14.

In the fourth embodiment, the liquid crystal inlet port 37 is adopted in place of the liquid crystal inlet port 35 in the third embodiment.

Figure 13:
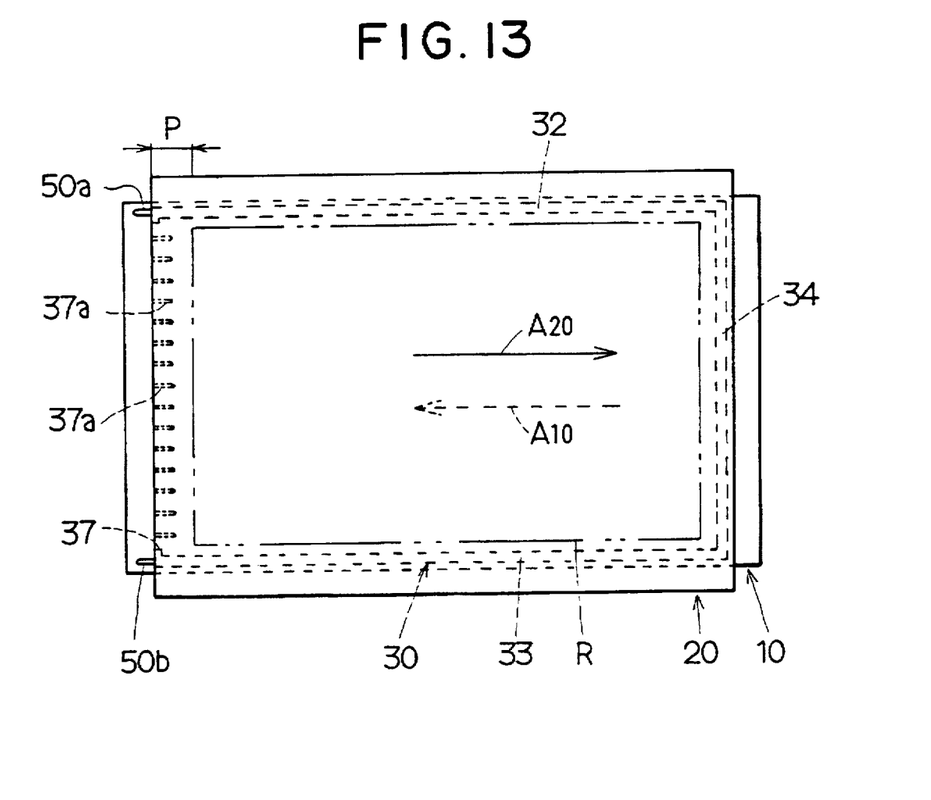
FIG. 13 is a plane view showing a liquid crystal cell of a fourth embodiment.

In the liquid crystal inlet port 37, plural dam seals 37a are printed in an oblong elliptic shape with its longitudinal axis aligned in parallel to the liquid crystal flow, as shown in FIG. 13.

Figure 14:
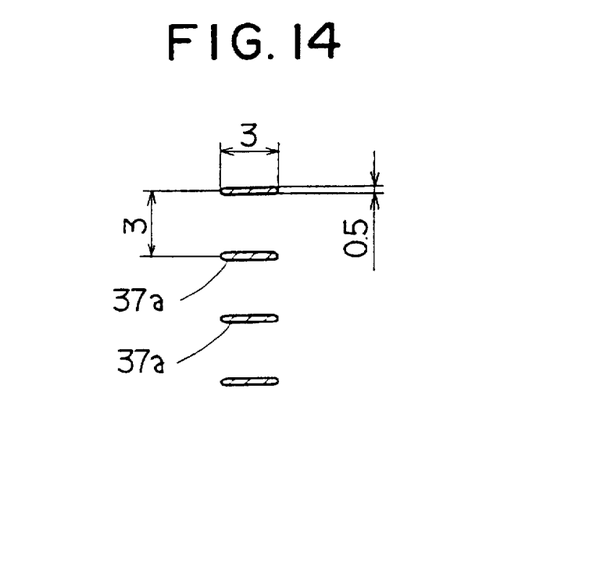
FIG. 14 is a schematic expanded plane view showing dam seals in a liquid crystal inlet port of the fourth embodiment.

Preferable dimensions measured after the dam seals are hardened are shown in FIG. 14. A width and a length of the sam seal 37a are 0.5 mm and 3 mm respectively, and a pitch between neighboring dam seals is 3 mm. Each of the dam seals 37a may be a streamlined shape directing to the flow of the liquid crystal.

In the liquid crystal filling process S8, liquid crystal is filled into the liquid crystal cell through the liquid crystal inlet port 37 in the same manner as in the first, second and third embodiments.

In this case, each dam seal 37a in the liquid crystal inlet port 37 is small in size and the longitudinal axis thereof is parallel to the flow direction of the liquid crystal, as shown in FIGS. 13 and 14. Therefore, turbulence in a flow of the liquid crystal passing through the liquid crystal inlet port 37 can be kept minimum. As a result, the liquid crystal flows uniformly and a uniform orientation thereof is attained.

Figure 15:
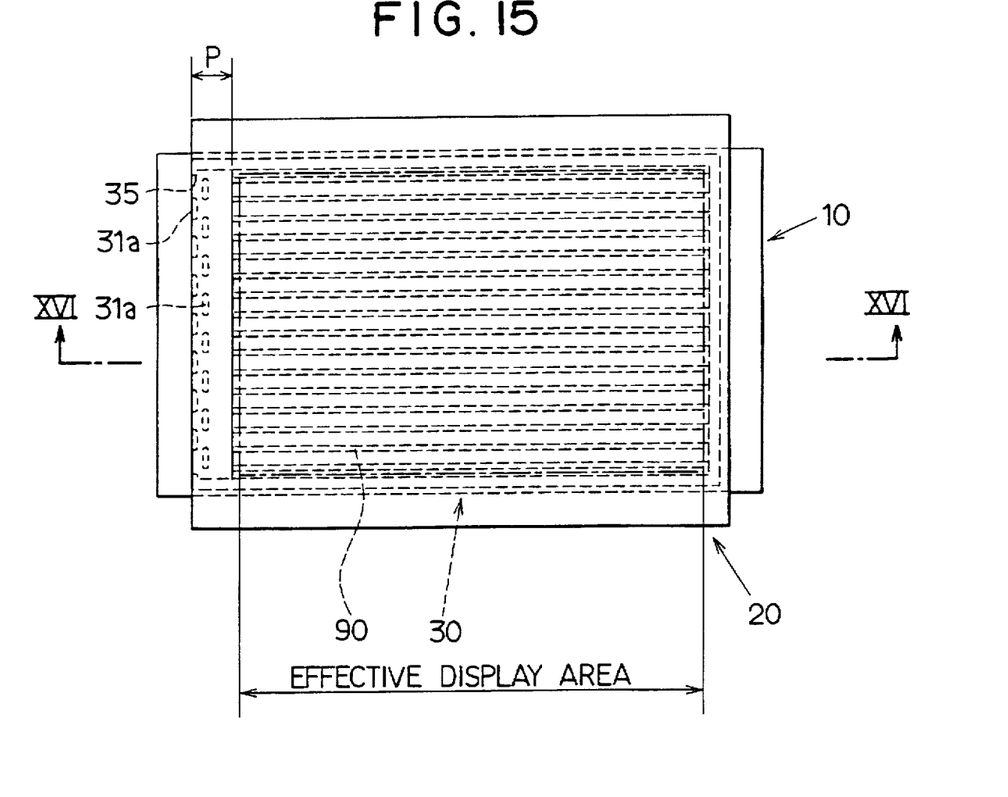
FIG. 15 is a plane view showing a liquid crystal cell of a fifth embodiment.
Figure 16:
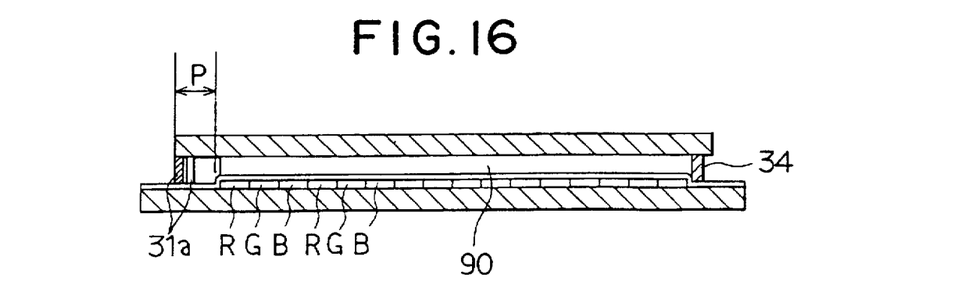
FIG. 16 is a cross-sectional view along the section XVI—XVI in FIG. 15 showing the liquid crystal cell of the fifth embodiment.

Next, a fifth embodiment will be described referring to FIGS. 15 and 16.

In the fifth embodiment, plural stripes of resist pillars 90 are disposed on the alignment layer 24 of the substrate 20 in addition to the dam seals 31a, substantially in the same way as mentioned in the second embodiment (see FIGS. 7 to 10). In other words, both features in the second and third embodiments are employed in this fifth embodiment.

Accordingly, combined effects attained in the second and third embodiments can be attained in the fifth embodiment.

Next, a sixth embodiment will be described referring to FIGS. 17 and 18.

In the sixth embodiment, dam seals 36a at a liquid crystal inlet port 36 are adopted in place of the dam seals 31a in the third embodiment.

Figure 17:
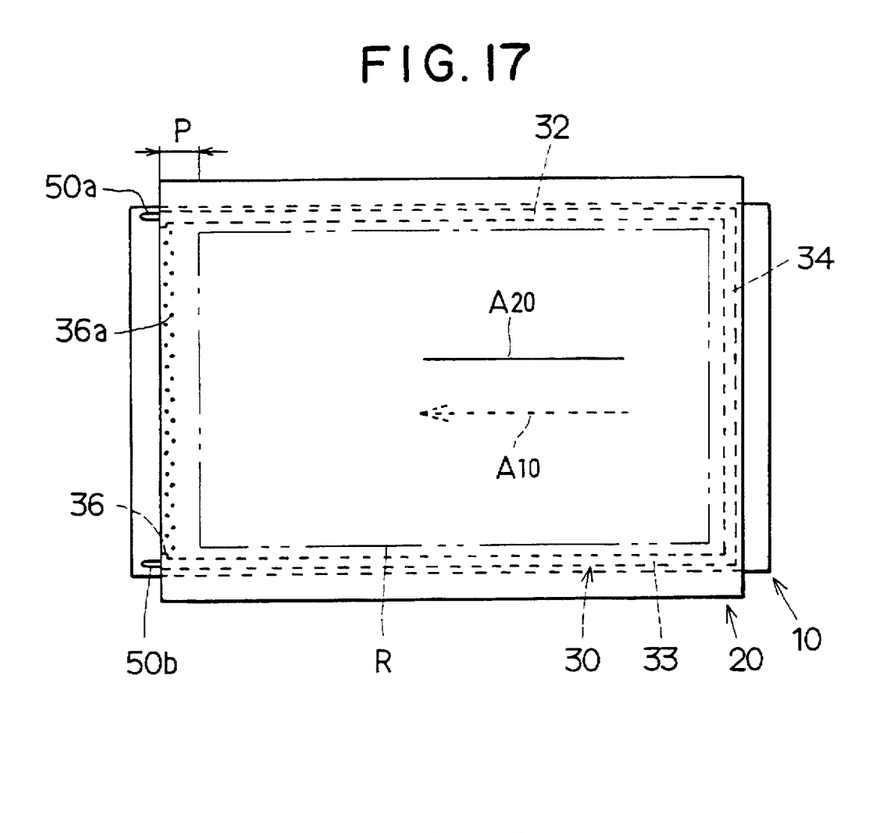
FIG. 17 is a plane view showing a liquid crystal cell of a sixth embodiment.
Figure 18:
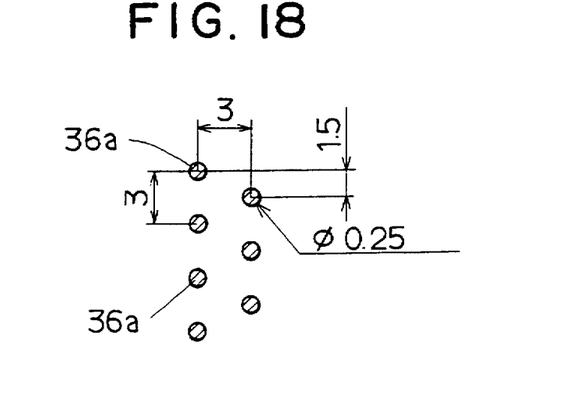
FIG. 18 is a schematic expanded plane view showing dam seals in a liquid crystal inlet port of the sixth embodiment.

In the liquid crystal inlet port 36, plural dam seals 36a each having a small dot-like shape are printed in a staggered arrangement as shown in FIGS. 17 and 18. The sixth embodiment differs from the third embodiment only in the shape of the dam seals 36a. Preferable dimensions of the dam seals, measured after the dam seals are hardened, are shown in FIG. 18. A pitch between two rows of dam seals is 3 mm, a pitch between neighboring seals in a same row is also 3 mm, a diameter of the individual dam seal is 0.25 mm, and a pitch between neighboring seals in different rows is 1.5 mm.

Liquid crystal is filled into the liquid crystal cell through the liquid crystal inlet port 36 in the same manner as in the foregoing embodiments.

In this case, each dam seal 36a in the liquid crystal inlet port 36 has a small dot-like shape and two rows of the dam seals 36a are aligned in a staggered arrangement as shown in FIG. 18. Further, a space P between the liquid crystal inlet port 36 and the effective display area R is provided in this embodiment, too, as in the third embodiment. Therefore, turbulence in a flow of the liquid crystal is minimized due to synergistic effects of the above mentioned features. As a result, the flow of the liquid crystal becomes uniform and a direction of the flow corresponds to a rubbing direction, whereby the same effects as those in the third embodiment can be attained.

Figure 19:
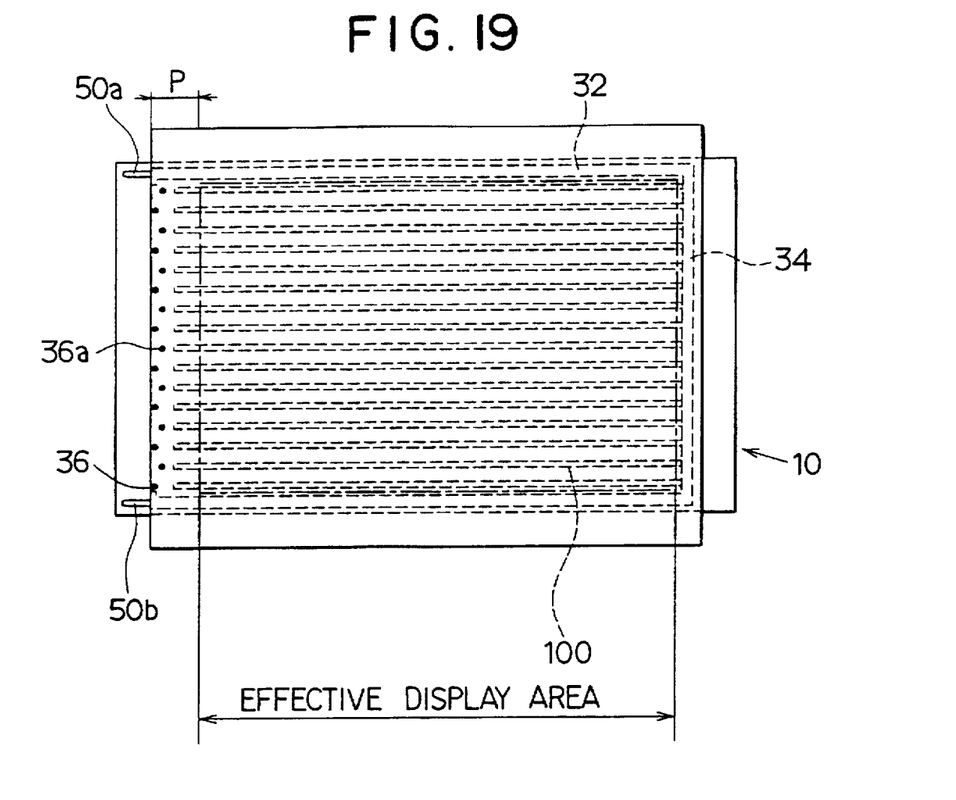
FIG. 19 is a plane view showing a liquid crystal cell of a seventh embodiment.
Figure 20:
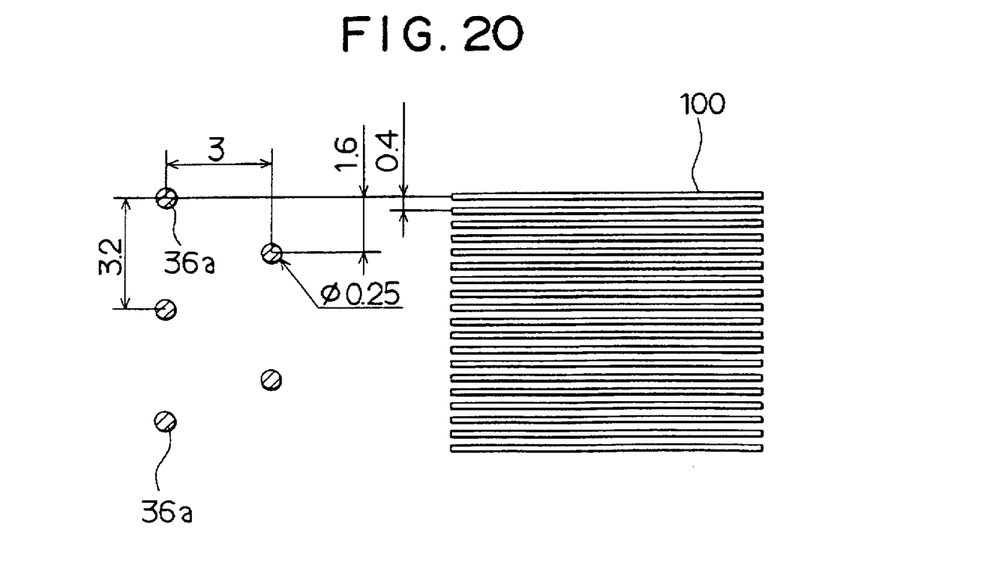
FIG. 20 is an expanded plane view showing a relationship in arrangement between dam seals and resist pillars of the seventh embodiment.

FIGS. 19 and 20 show a seventh embodiment.

In the seventh embodiment, plural stripes of resist pillars 100 are formed on the alignment layer 24 of the opposite substrate 20, which is the same as that in the sixth embodiment (see FIG. 17), substantially in the same way as mentioned in the second embodiment (see FIGS. 7 to 10).

Each resist pillar 100 is faced to each dam seal 36a as shown in FIG. 19, so that the flow of the liquid crystal is not disturbed by the dam seals 36a. The features other than the resist pillars 100 are the same as those in the sixth embodiment.

Accordingly, the same effects as the resist pillars 80 in the second embodiment can realize can be attained by the resist pillars 100 in the seventh embodiment in addition to the effects mentioned in the sixth embodiment.

Further, because of the above mentioned arrangement of the dam seals 36a and the resist pillars 100, even when turbulence such as stagnation occurs in a flow of the liquid crystal at a back side of each dam seal 36a (that is, between the dam seals 36a and the resist pillars 100), the turbulence is decreased by the end portion of the resist pillars 100 at the side of liquid crystal inlet port 36. Consequently, the flow of the liquid crystal into the effective display area becomes uniform.

As a result, even when the turbulence in the flow of the liquid crystal occurs at the back side of the dam seals 36a, it does not result in irregularity of orientation of the liquid crystal in the effective display area.

As a modification of the seventh embodiment, the dam seals 36a and the resist pillars 100 may be arranged as shown in FIG. 20. The dimensions of the preferable arrangement are shown in FIG. 20, but other selection are possible without departing from the gist of the present invention.

In the present invention, the manufacturing processes of the liquid crystal cell in the first embodiment may be adopted to produce the liquid crystal cell in the fourth or sixth embodiment. In this case, although the space P mentioned in the fourth embodiment becomes narrower, each dam seal with a small dot-like shape or an oblong ellipse shape causes almost no disturbance in the flow of the liquid crystal when the liquid crystal is filled. Therefore, the same effects as those in the first embodiment can be realized in addition to the effect that the gap between the substrates is secured more firmly by the dam seals.

In the foregoing embodiments, although the opening width W1 of the liquid crystal inlet port of the seal 30 is larger than the width W2 of the effective display area, this relationship may be modified. It is possible to make the opening width W1 of the liquid crystal inlet port of the seal 30 smaller than the width W2 of the effective display area R in case the uniform flow of the liquid crystal is substantially attained.

Further, in the present invention, after droplets of the liquid crystal are placed at the liquid crystal inlet port of the liquid crystal cell, the liquid crystal cell is disposed in the chamber 71 of the liquid crystal filling device 70. However, a separate liquid crystal supply device may be equipped in the chamber 71 so that the liquid crystal is supplied to the liquid crystal cell from the supply device before opening the leak valve 76.

Further, when the flowing direction of the liquid crystal is uniform, the flowing direction may deviate a little from the rubbing direction. This results in a little decrease of display contrast, but does not result in an irregular orientation of the liquid crystal.

The liquid crystal is not limited to the antiferroelectric liquid crystal, but it may be ferroelectric liquid crystal, smectic liquid crystal, nematic liquid crystal or the like. This invention can be applied not only to a color liquid crystal display but also to a monochrome liquid crystal display.

The dummy seal or dam seals may be formed apart from the seal 30 before the original substrates are overlapped.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A liquid crystal cell comprising:

a first electrode substrate;

a second electrode substrate overlapped on said first electrode substrate;

liquid crystal filled into a space between said first and second electrode substrates;

a seal member formed between said first and second electrode substrates with a liquid crystal inlet port for defining said space, and a dam seal member disposed in said liquid crystal inlet port; wherein, an opening width of said liquid crystal inlet port is larger than a width of an effective display area of said liquid crystal cell so that the liquid crystal is filled with a uniform flow into said space between said first and second electrode substrates;

a gap between said first and second electrode substrates in an area between said liquid crystal inlet port and said effective display area is larger than a gap between said first and second electrode substrates in said effective display area; and said dam seal member includes plural dam seals formed dispersively in said liquid crystal inlet port so that said liquid crystal is filled into said space through said liquid crystal inlet port without leaving any filling marks thereof.

2. A liquid crystal cell according to claim 1, further comprising;

a plurality of resist pillars, stretching in parallel to a filling direction of said liquid crystal, disposed between said first and second electrode substrates so that each of said resist pillars is aligned in line with one of said dam seals not to interfere with a filling flow of said liquid crystal, one end of each resist pillar facing said inlet port extending beyond said effective display area.

3. A liquid crystal cell according to claim 2, wherein said crystal is smectic liquid crystal.

4. A liquid crystal cell according to claim 1; wherein, each of said dam seals has a dot-like shape, an ellipse shape or a streamline shape.

5. A liquid crystal cell according to any one of claim 1, wherein said liquid crystal is smectic liquid crystal.

6. A method of manufacturing a liquid crystal cell having a first and a second electrode substrate, liquid crystal filled into a space between said first and second electrode substrates, and a seal member for defining said space, said method comprising:

a step of forming said seal member of one of said first and second electrode substrates with a liquid crystal inlet port, a width of which is wider than that of an effective display area;

a step of forming dam seals dispersively in said liquid crystal inlet port and outside said effective display area so that said dam seals do not disturb a flow of said liquid crystal when said liquid crystal is filled into said space;

a step of overlapping said first and second electrode substrates on each other with said seal member and said dam seals interposed therebetween; and a step of filling said liquid crystal into said space between said first and second electrode substrates through said liquid crystal inlet port; wherein, said seal member are formed so that a gap between said first and second electrode substrates in an area between said liquid crystal inlet port and said effective display area is larger than that in an area of the effective display area.

7. A method of manufacturing a liquid crystal cell according to claim 6; wherein, each of said dam seals is formed in a dot-like shape, an ellipse shape, or a streamline shape.

8. A method of manufacturing a liquid crystal cell according to claim 6; wherein, one of said first and second electrode substrates is a color filter substrate having a color filter and a protection film;

said liquid crystal is smectic liquid crystal; and said gap between said first and second electrode substrates in said area between said liquid crystal inlet port and said effective display area is larger than that in said area of said effective display area at least by a thickness of said color filter or said protection film.

9. A method of manufacturing a liquid crystal cell according to claim 6 or 8 wherein, said liquid crystal cell has its orientation control direction and said liquid crystal is filled generally parallel to said orientation control direction in said step of filling said liquid crystal.

10. A method of manufacturing a liquid crystal cell according to claim 6 or 8, wherein, in said step of filling said liquid crystal, said liquid crystal is placed in a form of droplets at said liquid crystal inlet port on one of said first and second electrode substrates before said liquid crystal flows into said space.

* * * * *

UNITED STATES PATENT AND TRADEMARK OFFICE
CERTIFICATE OF CORRECTION

PATENT NO. : 5,798,813
DATED : August 25, 1998
INVENTOR(S) : OHASHI et al.

It is certified that error appears in the above-identified patent and that said Letters Patent is hereby corrected as shown below:

On the title page, item

[73] Assignee: Ipics Corporation, Japan should read:

[73] Assignee: Nippondenso Co., Ltd., Kariya-city, Japan

Signed and Sealed this

Sixth Day of July, 1999

Attest:

Q. TODD DICKINSON

*Attesting Officer*      Acting Commissioner of Patents and Trademarks